US009022338B2

(12) United States Patent
Spillane et al.

(10) Patent No.: US 9,022,338 B2
(45) Date of Patent: May 5, 2015

(54) TEMPLATE HOLDER BRACKET AND SPRING PIN

(75) Inventors: Alexander F. Spillane, White Lake, MI (US); Bryan H. Voss, Warren, MI (US); Rodney D. Phillips, Mussey Township, MI (US)

(73) Assignee: Automation Services, LLC, Waterford, MI (US)

( * ) Notice: Subject to any disclaimer, the term of this patent is extended or adjusted under 35 U.S.C. 154(b) by 882 days.

(21) Appl. No.: 13/253,468

(22) Filed: Oct. 5, 2011

(65) Prior Publication Data

US 2012/0286121 A1 Nov. 15, 2012

Related U.S. Application Data

(60) Provisional application No. 61/485,382, filed on May 12, 2011.

(51) Int. Cl.
*A47F 5/00* (2006.01)
*B23Q 1/03* (2006.01)

(52) U.S. Cl.
CPC .......... *B23Q 1/032* (2013.01); *Y10T 29/49826* (2015.01)

(58) Field of Classification Search
CPC .... B23Q 1/032; Y10T 29/49826; B27C 5/06; B25B 11/02; B25B 47/28
See application file for complete search history.

(56) References Cited

PUBLICATIONS

Photos of Prior Art Device sold prior to Oct. 5, 2011.

*Primary Examiner* — Amy Sterling
(74) *Attorney, Agent, or Firm* — Brooks Kushman P.C.

(57) ABSTRACT

A template holder bracket and method of assembling and disassembling a template from the bracket. The bracket has a spring pin assembly that is secured to the bracket that holds the template in a locked position. The spring pin assembly includes a pin, a housing and a spring that biases the pin into engagement with the template. The template may be removed by rotating the template against a ramp surface on the pin assembly that disengages the pin from the template against the biasing force of the spring.

8 Claims, 5 Drawing Sheets

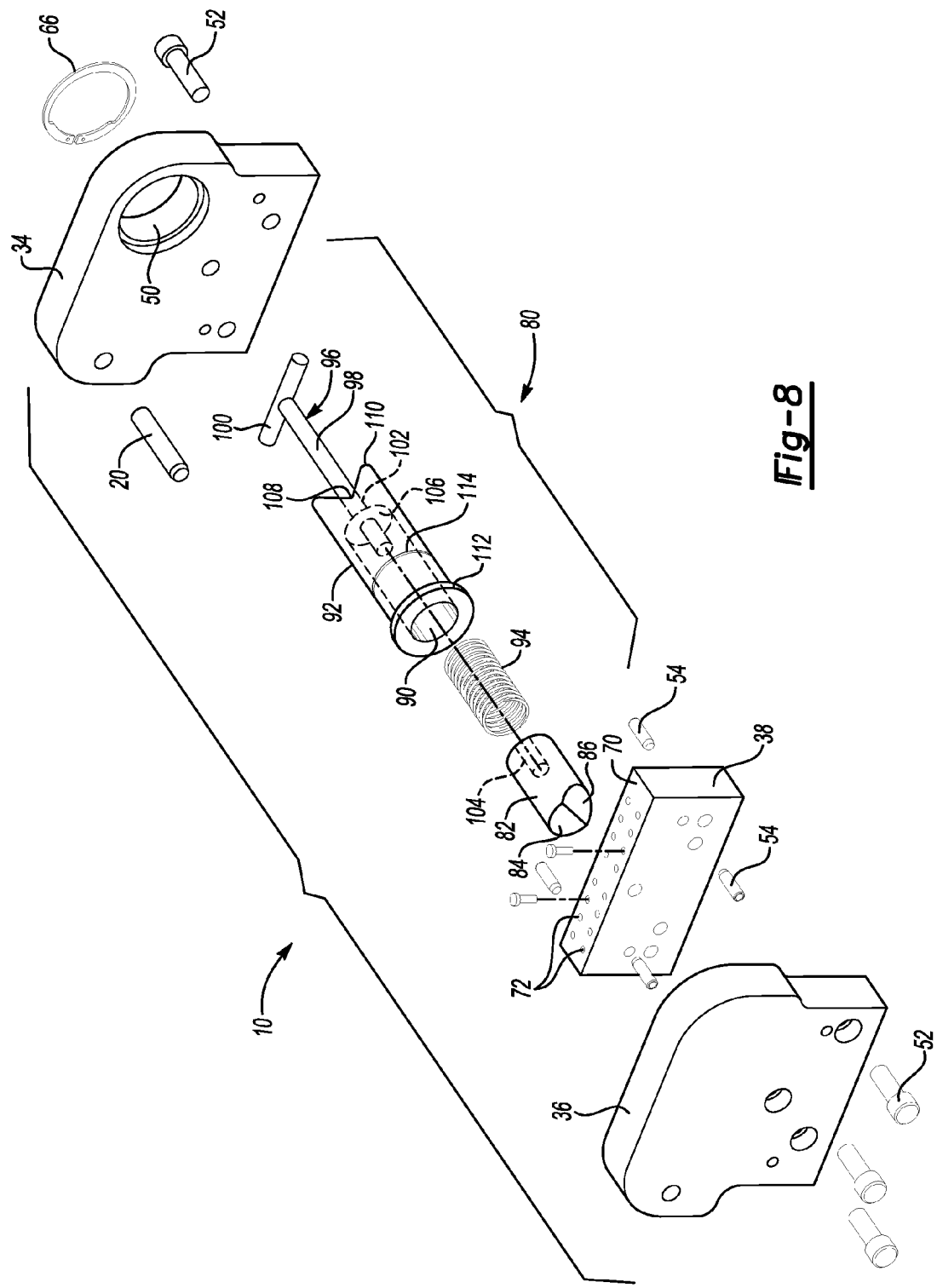

TEMPLATE HOLDER BRACKET AND SPRING PIN

CROSS-REFERENCE TO RELATED APPLICATIONS

This application claims the benefit of U.S. provisional Application No. 61/485,382 filed May 12, 2011, the disclosure of which is incorporated in its entirety by reference herein.

TECHNICAL FIELD

A template bracket for a part holding fixture that is used to hold parts between operations on a manufacturing line.

BACKGROUND

Manufacturing and assembly lines may be loaded and unloaded by robotic devices. The robotic devices may pick up work pieces from a fixture or holding device and load them into an operation in a press, a welder, or the like. Between operations, a robot may unload the part and place it on another fixture.

A variety of different parts may be processed on the same manufacturing line. The parts processed on a line may have different shapes that require differently shaped templates on the fixtures to support the parts. Manufacturing lines may be changed over relatively frequently to accommodate different part styles that have different shapes and require different fixture locating points. The templates retained by the template holder brackets must be locked in place. Properly locating fixture templates minimizes the risk of damage to the parts as a result of the parts being placed upon improperly located fixture templates.

Some prior art fixture templates were secured to brackets by means of two pins that are inserted through a wall of the bracket and into corresponding holes in the base of the template. With this approach, workers may inadvertently fail to insert one or both pins leaving the template in an unstable condition. The pins are generally removed completely from the bracket and set aside until a new template is to be secured to the bracket. The pins may be misplaced or lost when they are removed from the bracket.

In a modification of the template, a slot may be provided in the template base that receives a pin that is permanently secured to one end of the bracket. The template base is then secured by inserting a removable pin into the side of the bracket and the template base to hold the template base in place. This approach permits one of the removable pins that is generally required to hold the template in the bracket to be eliminated, but still leaves one removable pin that is required to lock the template into the bracket.

Applicants' invention is directed to solving the above problems relating to fixture templates that are secured to brackets by one or more removable pins.

SUMMARY

According to one aspect of this disclosure, a template bracket assembly is provided for holding a template for a part holding fixture in a manufacturing operation. The template bracket assembly comprises a bracket defining a slot for receiving the template. A pressure pin assembly retained by the bracket includes a pin that may be shifted between a locking position and a released position. A spring element biases the pin into the locking position. The template is retained in the bracket when the pin is in the locking position. The template is released from the bracket by shifting the pin to the released position without removing the pin from the bracket.

According to other aspects of the disclosure, the pin may define a ramp surface on a distal end of the plunger that facilitates disengaging the second portion of the plunger from the template. The ramp surface may form a crowned end of the plunger, or alternatively, the ramp surface may be a flat beveled surface that is contiguous with the distal end of the plunger.

The pressure pin assembly may further comprise a support member that engages a surface formed inside a housing that is engaged by the pin that forms a pin assembly. The support member may be adjusted to change the effective length of the pin assembly. Changing the length of the pin assembly changes the extent that the pin protrudes into the slot and the extent that the spring element biases the pin.

The template bracket assembly may further comprise a clip engaging a support plate that is part of the bracket and that is attached to the pressure pin assembly. A flange extends radially outwardly from the pressure pin assembly. The support plate defines a receptacle hole and also defines a recess about the receptacle hole that receives the flange so that the pressure pin assembly may be secured to the support plate between the clip and the flange.

The pressure pin assembly may further comprise a handle that is attached to an outside end of a shaft that extends through the pressure pin assembly and is attached to the pin. The pressure pin assembly may define a seat that receives the handle in the locking position. The handle may be pulled from the seat to move the pin to the released position without separating the pressure pin assembly from the bracket.

According to another aspect of the disclosure, a pressure pin assembly is provided for a template bracket that holds a template for a part holding fixture in a manufacturing operation. The template bracket comprises a support plate defining a receptacle hole that receives the pressure pin assembly, a back-up plate disposed in a parallel orientation spaced from the support plate. A spacer may be disposed between the support plate and the back-up plate. The support plate, spacer and back-up plate are secured together in a fixed relationship. The pressure pin assembly includes a plunger and a housing defining a bore that receives a first portion the plunger in one end of the housing with a second portion of the plunger extending from the housing. The housing is assembled to the support plate with the second portion of the plunger protruding from the support plate toward the back-up plate. A biasing element, such as a spring, engages the plunger and biases the plunger toward the back-up plate. The template may be inserted between the support plate and the back-up plate. The template defines a recess that at least partially receives the second portion of the plunger to temporarily retain the template in a fixed position. The template may be removed from the template bracket by rotating the template about an axis radially spaced from the plunger to disengage the second portion of the plunger from the recess against the biasing force of the biasing element.

According to further aspects of the disclosure, the recess in the template may be a hole that extends through the template. The plunger may define a ramp surface on a distal end of the plunger that facilitates disengaging the second portion of the plunger from the template.

The pressure pin assembly may further comprise a support bolt having a head that engages a shoulder formed inside the bore. The plunger may define a threaded bore on an inner end of the plunger that receives the support bolt to form a plunger assembly. The support bolt may be rotated to change the effective length of the plunger assembly and thereby change the extent that the plunger protrudes from the support plate and the extent to which the biasing element biases the plunger.

The pressure pin assembly may further comprise a clip engaging an outer surface of the support plate that attaches to an outer surface of the housing and a flange extending radially outwardly from the housing. The support plate may define a recess about the receptacle hole that receives the flange so that the housing may be secured to the support plate between the clip and the flange. The clip may be a spring clip, the flange may be a circular rim, and the recess may be a circular recess that receives the rim.

Alternatively, the pressure pin assembly may further comprise a handle that is attached to an outside end of a pin that extends through the housing with an inside end of the pin being attached to the plunger. The housing may define a seat that receives the handle in a locking position in which the plunger is received in the recess in the template. The handle may be pulled from the seat defined by the housing to withdraw the plunger from the recess in the template and moved to an unlocking position.

A method is disclosed for assembling a template to a bracket that defines a slot for receiving the template and a pressure pin assembly that is attached to the bracket. The method may comprise a first step of inserting the template into the slot. The template may then be located relative to the bracket by aligning the pressure pin assembly with a recess defined in the template. A movable pin of the pressure pin assembly is shifted in a direction that is normal to a surface of the template that defines the recess. The movable pin locks the template within the bracket when the pin is partially received in the recess. The template is removed from the slot by moving the template within the slot perpendicular to the direction that the pin is biased.

According to other aspects of the method, a locating pin may be provided on the bracket and the template may define a slot. The step of inserting the template into the slot may further comprise placing the template in the bracket with the slot receiving the locating pin. The template may then be rotated within the slot until the pin is partially received in the recess. The step of removing the template from the slot may further comprise rotating the template about the locating pin to separate the pin from the recess. The movable pin may include a beveled surface that functions as a ramp surface for moving the pin against the force of a spring that biases the movable pin in a direction normal to the surface of the template that defines the recess.

Alternatively, the movable pin may include a handle that is attached to an outside end of the pin with an inside end the pin being attached to the movable pin. A seat may receive the handle in a locking position in which the pin is received in the recess in the template. The step of shifting the movable pin may further comprise placing the handle in the recess. The step of removing the template from the slot may further comprise pulling the handle from the seat to withdraw the pin from the recess in the template. By pulling the handle, the pin is moved to a release position while keeping the pressure pin assembly attached to the bracket.

These and other aspects of the disclosure will be better understood in view of the attached drawings and the following detailed description of the illustrated embodiments.

BRIEF DESCRIPTION OF THE DRAWINGS

FIG. 8 is an exploded perspective view of an alternative embodiment of a template holder bracket and spring pin.

DETAILED DESCRIPTION

A detailed embodiment of the present invention is disclosed in this application. The disclosed embodiment is merely exemplary of the invention that may be embodied in various and alternative forms. The figures are not necessarily to scale and some features may be exaggerated or minimized to show details of particular components. The specific structural and functional details disclosed in this application are not to be interpreted as limiting, but merely as a representative basis for teaching one skilled in the art how to practice the present invention.

Figure 1:
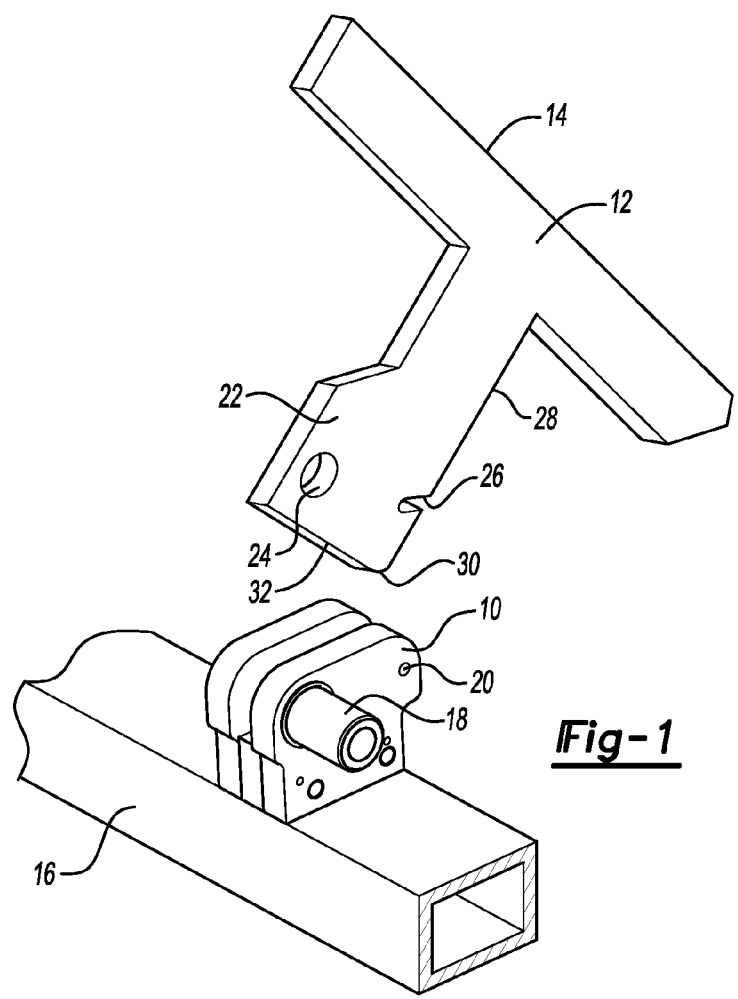
FIG. 1 is a fragmentary perspective view of a part holding fixture showing a template supported by a bracket on a rail of the fixture.

Referring to FIG. 1, a bracket 10 is shown with a template 12 that has a part engaging surface 14. The template 12 is positioned above the bracket 10, ready to be installed in the bracket. The template 12 is used to support a part (not shown) in a manufacturing process between manufacturing operations. The bracket 10 is secured to a base rail 16 of a fixture that supports the template 12 and holds the part at a convenient height.

The template 12 is secured to the bracket 10 by a pressure pin assembly 18 and a fixed pin 20. The template 12 has a template base portion 22 that is engaged by the pressure pin assembly 18 and that also receives the fixed pin 20. A hole 24, or recess, is provided in the template base portion 22 that is engaged by the pressure pin assembly 18. An angled slot 26 is provided in a vertically extending edge 28 of the template 12 that receives the fixed pin 20. The edge 28 is the leading edge of the template base portion 22 when the template 12 is inserted into the bracket 10. A rounded corner 30 is provided on the lower corner of the template base portion 22 below the angled slot 26. The rounded corner 30 provides clearance for rotation of the template 12 about the fixed pin 20. During installation, the template 12 is rotated about the fixed pin 20 until the pressure pin assembly 18 is received in the hole 24. The illustrated hole 24 is a through hole, however, it would be possible to provide a recess that does not extend through the entire thickness of the template base portion 22.

A base surface 32 of the template base portion 22 may include a recess for receiving one or more locating pins, or screw heads, as will be more fully described below with reference to FIGS. 3 and 5.

Figure 2:
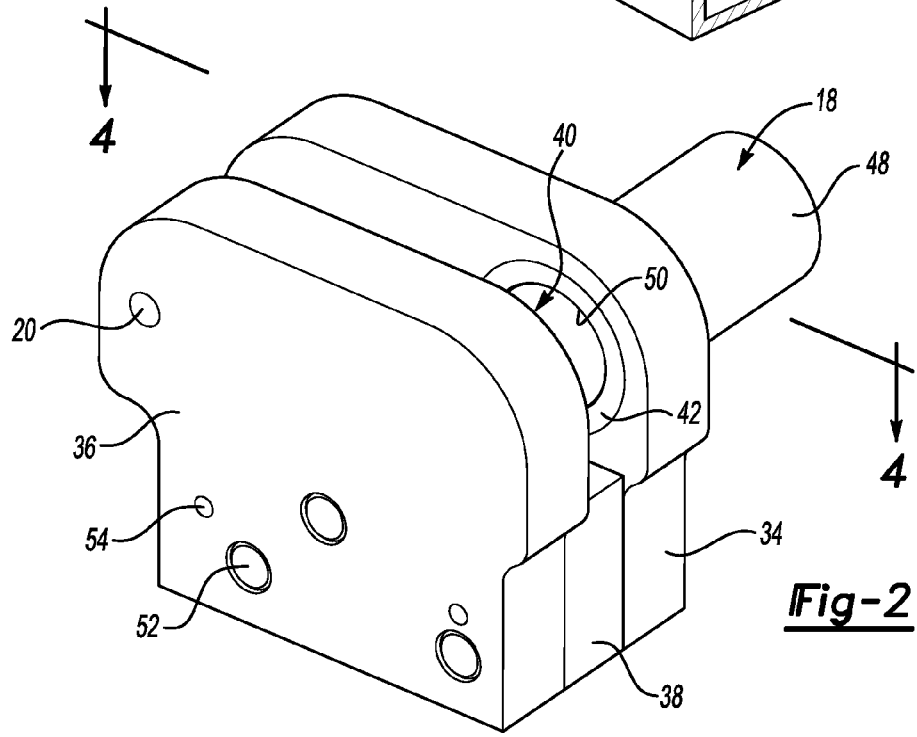
FIG. 2 is a perspective view of a template holder bracket.

Referring to FIG. 2, a bracket 10 is shown to be comprised of a support plate 34 that is connected to a back-up plate 36 through a spacer plate 38. The support plate 34 supports the pressure pin assembly 18. The back-up plate 36 backs up the template base portion 22 (as shown in FIG. 1) against the force applied by the pressure pin assembly 18. The spacer plate 38 spaces the support plate 34 and back-up plate 36 apart by the width of the template base portion 22. As shown in FIG. 2, a plunger 40 of the pressure pin assembly 18 protrudes slightly into the space between the support plate 34 and the back-up plate 36 to exert a biasing force on one side of the template base portion. The plunger 40 has a crowned end 42 that is beveled or generally convex in shape. The crowned end 42 provides a ramp surface that facilitates insertion of the template 12, as shown in FIG. 1. A pin housing 48 extends outwardly from the support plate 34.

A pin housing 48 extends through a hole 50 defined in the support plate 34. The support plate 34 and back-up plate 36 are securely fastened together by means of bolts 52 and locating pins 54 that secure the back-up plate 36, as shown in FIG. 2, to the spacer plate 38.

Figure 3:
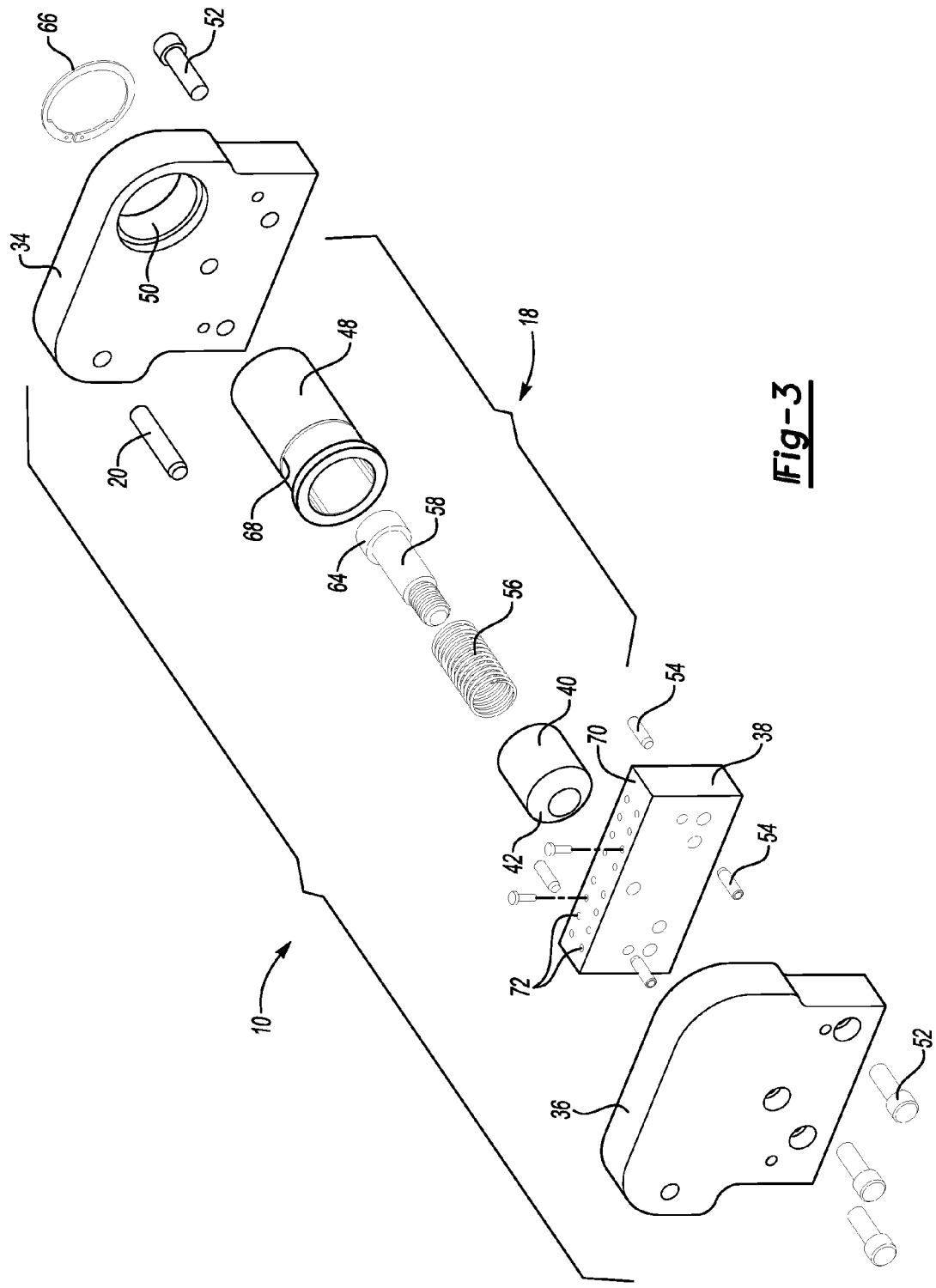
FIG. 3 is an exploded perspective view of a template holder bracket and spring pin.
Figure 4:
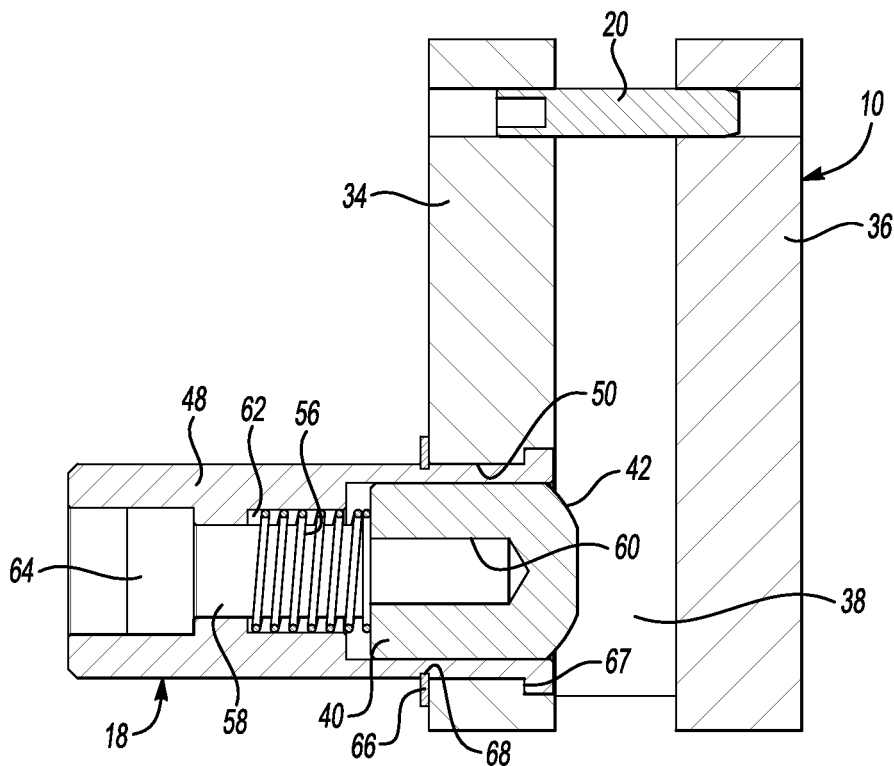
FIG. 4 is a cross-sectional view taken along the line 4-4 in FIG. 2 of the bracket and the spring pin.

Referring to FIGS. 3 and 4, an exploded perspective view and a cross-sectional view of the pressure pin assembly 18 are provided to illustrate the structure and function of the pressure pin assembly 18. The pin housing 48 is inserted from the inside of the support plate 34 through the hole 50. The plunger 40 is supported within the housing 48 with its crowned end 42 extending inboard of the support plate 34. A helical spring 56 is received about a support bolt 58. The support bolt 58 is received in a threaded hole 60, shown in FIG. 4, formed in the plunger 40. The spring 56 engages the plunger 40 about the support bolt 58 on one end and on the other end engages a shoulder 62, or lip, formed within the housing 48. A bolt head 64 is received within the housing 48 on the opposite side of the shoulder 62 from the plunger 40. It is preferred that the pressure applied by the pressure pin assembly 18 be set at a predetermined level established by the selection of the spring 56. The spring force selected should permit insertion and removal of the template 12 with a controlled level of force that provides a rigid holding force, but a force that may be easily overcome by rotating the template 12 about the fixed pin 20. As the template is rotated, the template base 22 shifts the plunger 40 that compresses the spring 56.

The pressure pin assembly 18 is secured to the support plate 34 by a spring clip retainer 66 that captures the support plate 34 between a rim 67 of the pin housing 48 and the spring clip retainer 66 that is received in a slot 68 formed on the exterior of the pin housing 48.

Referring to FIG. 3, the back-up plate 36 is secured by bolts 52 and locating pin 54 to the spacer plate 38. Either the support plate 34 or back-up plate 36 may be disassembled from the spacer plate 38 when the pressure pin assembly 18 is secured within the hole 50 provided in the support plate 34. The pin housing 48 is inserted from the inside of the support plate 34 into the hole 50. The pressure pin assembly 18 is secured on the outer side of the support plate 34 by the spring clip retainer 66. Before assembling the pressure pin assembly 18 to the support plate 34, the plunger 40, helical spring 56 and support bolt 58 are assembled together and inserted into the pin housing 48. When the pressure pin assembly 18 is assembled to the support plate 34, the crowned end 42 of the plunger 40 extends slightly into the space defined between the support plate 34 and the back-up plate 36. Bolts 52 and locating pins 54 are used to secure the support plate 34 to the spacer plate 38. The fixed pin 20 is secured between the support plate 34 and the back-up plate 36. The fixed pin 20 and pressure pin assembly 18 are generally aligned with their central axes aligned horizontally as shown in the illustrated embodiment.

Figure 5:
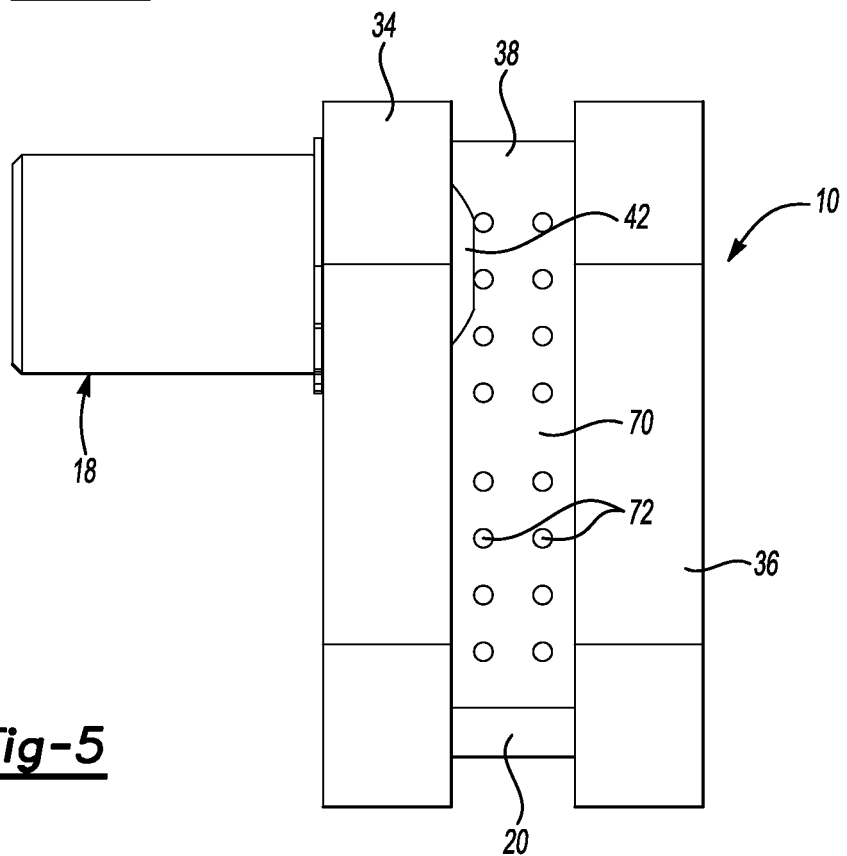
FIG. 5 is a top plan view of a template holder bracket and spring pin.

Referring to FIGS. 3 and 5, the spacer plate 38 has a top surface 70 that includes a plurality of sequencing holes 72. The sequencing holes are adapted to receive a screw or pin that is matched to a recess (not shown) formed on the base of a template 12 so that the templates 12 are assured to be assembled to the desired bracket 10.

Referring to FIG. 5, the bracket 10, pressure pin assembly 18 and fixed pin 20 are shown assembled together. The crowned end 42 is shown extending inwardly from the support plate 34. The pressure pin assembly 18 is assembled to the support plate 34 and extends outwardly from the support plate 34. The fixed pin 20 is fixedly secured between the support plate 34 and the back-up plate 36. The sequencing holes 72 may be used to receive a pin or screw to coordinate assembly of the desired template 12 to the bracket 10.

Figure 6:
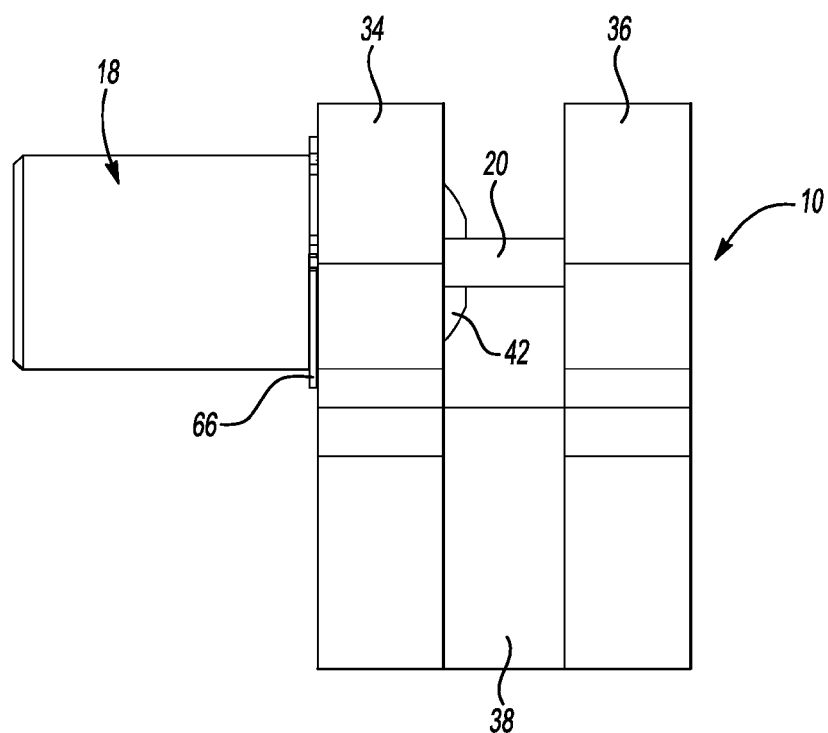
FIG. 6 is a front elevation view of a template holder bracket and spring pin.

Referring to FIG. 6, the bracket 10, pressure pin assembly 18 and fixed pin 20 are shown assembled together. The crowned end 42 is shown extending inboard of the support plate 34. The fixed pin 20 is shown extending between the support plate 34 and the back-up plate 36. The spring clip retainer 66 is shown securing the pressure pin assembly 18 to the support plate 34.

Figure 7:
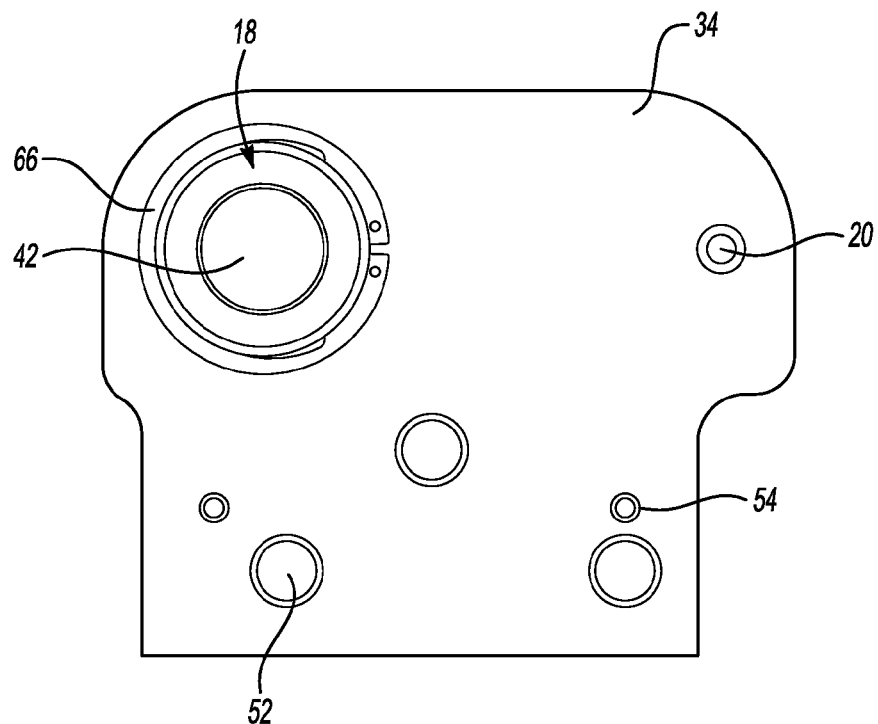
FIG. 7 is a side elevation view of a template holder bracket and spring pin.

Referring to FIG. 7, the support plate 34 is shown with the pressure pin assembly 18 and fixed pin 20. The bolts 52 and locating pins 54 are shown that are used to secure the support plate 34 to the spacer plate 38, as shown in FIGS. 1-6.

Referring to FIG. 8, an alternative embodiment of a locking pin 80 is illustrated with the bracket 10 disclosed with reference to FIGS. 1-7 above. The same reference numerals are used with the corresponding parts that are common to both embodiments. The locking pin 80 includes a plunger 82 that has an end surface 84 and a beveled ramp surface 86 on a distal end of the plunger 82. The plunger 82 is telescopically received in a bore 90 defined by a plunger housing 92. The plunger housing 92 is received within an opening 50 defined in the support plate 34. The support plate 34 and back-up plate 36 are securely fastened together by means of bolts 52 and locating pins 54 that secure the back-up plate 36, as shown in FIG. 2, to the spacer plate 38.

The plunger housing 92 is inserted into the support plate 34 through the hole 50. The plunger 82 is supported within the plunger housing 92 with the end surface 84 and the beveled ramp surface 86 extending inboard of the support plate 34. A helical spring 94 is received about a T-shaped handle 96 that includes a shaft portion 98 and a handle portion 100. The shaft portion 98 is inserted in the bore 90 and a hole 102 formed in the plunger housing 92. The shaft portion 98 is secured in a hole 104 formed in the plunger 82.

The spring 94 engages the plunger 82 about the shaft portion 98 on one end and on the other end engages a base 106 of the bore 90 formed in the plunger housing 92. Pressure applied by the locking pin 80 is limited to a predetermined level established by the selection of the spring 94. The spring force selected should permit the plunger 82 to be withdrawn by pulling the handle portion 100 with a controlled level of force that provides a rigid holding force. However, the level of force must be able to be easily overcome by pulling the handle portion 100.

The handle portion 100 is received in a V-shaped recess 108 defined in the back end 110 of the plunger housing 92 when the plunger 82 is in a locking position. In the locking position, the plunger 82 may be received in the hole 24 formed in the template 12 to hold the template 12 in position as previously described with reference to FIG. 1. The handle portion 100 may be withdrawn and rotated to an unlocked position with the handle portion 100 held out of the V-shaped recess 108 to hold the plunger 82 retracted into the plunger housing 92. If desired, a smaller recess (not shown) may be provided on the back end 110 of the plunger housing 92 to hold the handle portion 100 in the unlocked position.

The locking pin assembly 80 is secured to the support plate 34 by a spring clip retainer 66 that captures the support plate 34 between a rim 112 of the plunger housing 92 and the spring clip retainer 66 that is received in a slot 114 formed on the exterior of the plunger housing 92.

Referring to FIGS. 3 and 8, the back-up plate 36 is secured by bolts 52 and locating pin 54 to the spacer plate 38. Either the support plate 34 or back-up plate 36 may be disassembled from the spacer plate 38 when the locking pin assembly 80 is secured within the hole 50 provided in the support plate 34. The plunger housing 92 is inserted from the inside of the support plate 34 into the hole 50. The locking pin assembly 80 is secured on the outer side of the support plate 34 by the spring clip retainer 66. Before assembling the locking pin assembly 80 to the support plate 34, the plunger 92, helical spring 94 and T-shaped handle 96 are assembled together and inserted into the plunger housing 92. When the locking pin assembly 80 is assembled to the support plate 34, the end surface 84 and the beveled ramp surface 86 of the plunger 82 extend slightly into the space defined between the support plate 34 and the back-up plate 36. Bolts 52 and locating pins 54 are used to secure the support plate 34 to the spacer plate 38. The fixed pin 20 is secured between the support plate 34 and the back-up plate 36. The fixed pin 20 and locking pin assembly 80 are generally aligned with their central axes aligned horizontally as previously described.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

We claim:

1. A pressure pin assembly for a template bracket for holding a template for a part holding fixture in a manufacturing operation, wherein the template bracket comprises a support plate defining a receptacle hole that receives the pressure pin assembly, a back-up plate disposed in a parallel orientation spaced from the support plate, and a spacer disposed between the support plate and the back-up plate, wherein the support plate, spacer and back-up plate are secured together in a fixed relationship, the pressure pin assembly including:
    a plunger;
    a housing defining a bore that receives a first portion the plunger in one end of the housing with a second portion of the plunger extending from the housing, the housing being assembled to the support plate with the second portion of the plunger protruding from the support plate toward the back-up plate; and
    a biasing element engaging the plunger that biases the plunger toward the back-up plate, wherein the template is insertable between the support plate and the back-up plate, the template defining a recess that at least partially receives the second portion of the plunger to temporarily retain the template in a fixed position, and wherein the template may be removed from the template bracket by rotating the template about an axis radially spaced from the plunger to disengage the second portion of the plunger from the recess against the biasing force of the biasing element.

2. The pressure pin assembly of claim 1 wherein the recess in the template is a hole that extends through the template.

3. The pressure pin assembly of claim 1 wherein the plunger defines a ramp surface on a distal end of the plunger that facilitates disengaging the second portion of the plunger from the template.

4. The pressure pin assembly of claim 1 further comprising:
    a support bolt having a head that engages a shoulder formed inside the bore; and
    the plunger defining a threaded bore on an inner end of the plunger that receives the support bolt to form a plunger assembly, wherein the support bolt may be rotated to change the effective length of the plunger assembly to change the extent that the plunger protrudes from the support plate and the extent that the biasing element biases the plunger.

5. The pressure pin assembly of claim 1 wherein the biasing element is a helical spring.

6. The pressure pin assembly of claim 1 further comprising:
    a clip engaging an outer surface of the support plate that attaches to an outer surface of the housing;
    a flange extending radially outwardly from the housing; and
    wherein the support plate defines a recess about the receptacle hole that receives the flange, and wherein the housing is secured to the support plate between the clip and the flange.

7. The pressure pin assembly of claim 6 wherein the clip is a spring clip and the flange is a circular rim, and the recess is a circular recess, wherein the rim is received in the recess.

8. The pressure pin assembly of claim 1 further comprising:
    a handle that is attached to an outside end of a pin that extends through the housing, wherein an inside end the pin is attached to the plunger; and
    the housing defining a seat that receives the handle in a locking position in which the plunger is received in the recess in the template, and wherein the handle may be pulled from the seat defined by the housing to withdraw the plunger from the recess in the template and moved to an unlocking position.

* * * * *